No. 771,531. PATENTED OCT. 4, 1904.
H. J. CASE.
HARROW.
APPLICATION FILED FEB. 21, 1903.
NO MODEL.
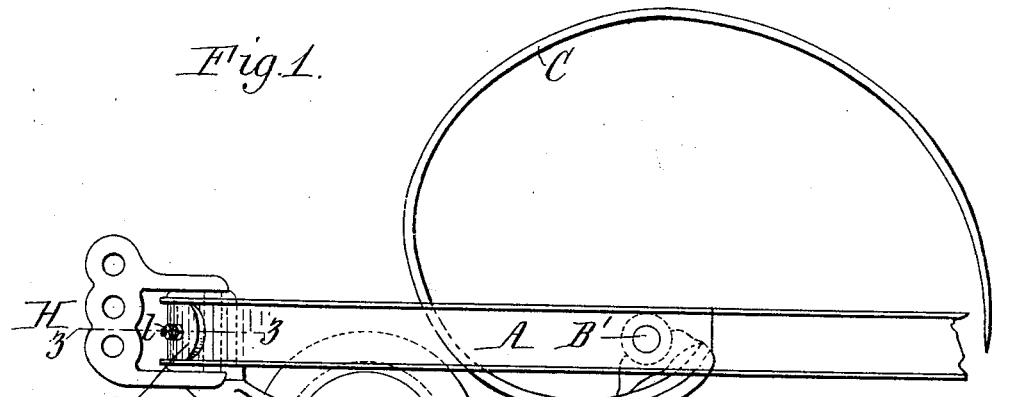
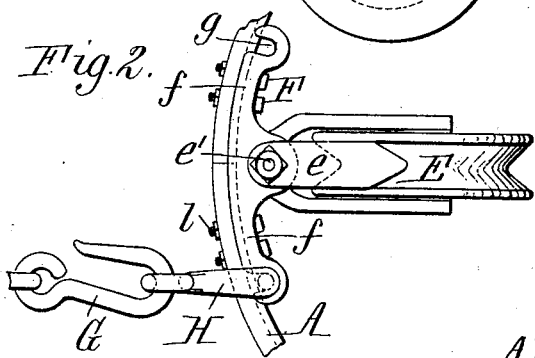
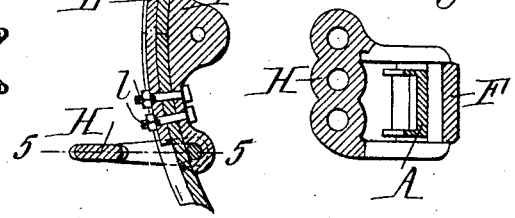
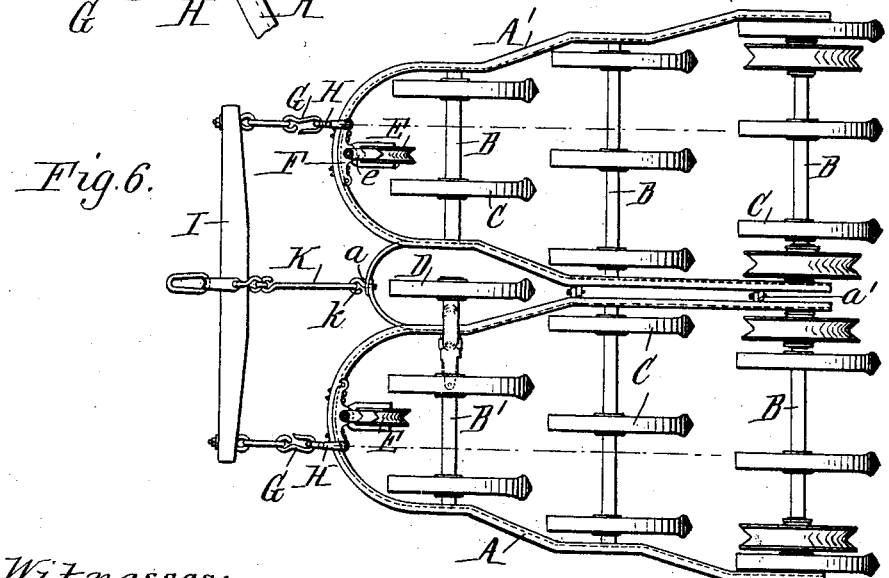
Witnesses:
R. W. Runser
E. A. Volk
Henry J. Case  Inventor.
By Wilhelm Bonner
Attorneys.

No. 771,531.

Patented October 4, 1904.

UNITED STATES PATENT OFFICE.

HENRY J. CASE, OF OWASCO, NEW YORK, ASSIGNOR TO ADRIANCE, PLATT & COMPANY, OF POUGHKEEPSIE, NEW YORK.

HARROW.

SPECIFICATION forming part of Letters Patent No. 771,531, dated October 4, 1904.

Application filed February 21, 1903. Serial No. 144,410. (No model.)

*To all whom it may concern:*

Be it known that I, HENRY J. CASE, a citizen of the United States, and a resident of Owasco, in the county of Cayuga, in the State of New York, have invented a new and useful Improvement in Harrows, of which the following is a specification.

This invention relates to that class of harrows in which the harrow is composed of two sections arranged side by side, each comprising a frame, cross-bars mounted therein, and teeth secured to the bars, and in which these frames have their adjacent or inner longitudinal bars flexibly connected, as by hinges having longitudinal pivots, so that the frames can rise and fall and may assume a greater or less angle to each other, whereby the harrow is enabled to adapt itself to inequalities in the surface of the ground. The teeth in this style of harrow are usually spring-teeth, and these harrows are sometimes called "butterfly-harrows." In harrows of this construction the draft has usually been applied to the two frames by means of an evener or transverse draft-bar, which is connected near each end by a rearwardly-extending draft connection with the front end of the corresponding harrow-frame. This draft connection has been attached to each harrow-frame, in the center line thereof, and it has been found in practice that the two frames are liable to be forced or crowded by the draft against or toward each other, whereby the inner portions of the two frames, which are hinged together, develop a tendency to rise, thereby raising the teeth which are near the middle of the harrow and preventing the middle teeth from cutting to the same depth as the outside teeth. This difficulty arises from the fact that in harrows of this construction the teeth which are located inside of the line of draft in each frame are either less numerous or are not more numerous than those which are located outside of the line of draft, whereby the teeth located outside of the line of draft preponderate in their action and crowd the frame inwardly.

The object of this invention is to overcome this difficulty and to attach the draft connections to the harrow-frames in such manner that each section will run level and the middle teeth will cut practically to the same depth as the outside teeth and work better over ridges and in furrows.

In the accompanying drawings, Figure 1 is a side elevation of the front portion of a harrow provided with my improvements. Fig. 2 is a top plan view of the draft connection. Fig. 3 is a horizontal section of the draft connection in line 3 3, Fig. 1. Fig. 4 is a vertical section in line 4 4, Fig. 3. Fig. 5 is a vertical section in line 5 5, Fig. 3. Fig. 6 is a top plan view, on a reduced scale, of a harrow provided with my improvements.

Like letters of reference refer to like parts in the several figures.

A A' represent the horizontal frames of two harrow-sections, arranged side by side and connected by hinges $a\ a'$, having longitudinal pivots, as usual. Each frame is preferably constructed, as usual, of channel-bars bent to an elongated U form, having the flanges arranged on the outer side and joined at the front end of the frame.

B B' represent the tooth-bars, which are arranged transversely in each frame in any suitable manner, and C D represent the teeth secured to said bars. The teeth are preferably spring-teeth, as shown, but may be of any other desired construction. The front tooth-bar B' of the frame or section A is preferably extended inwardly over the frame in a well-known manner and carries at its inner end a central tooth D, arranged midway between the two sections or frames.

E represents the caster-wheel, arranged at the front of each frame, in the center line thereof, in the usual manner.

F represents a bearing which is arranged in the front portion of each frame, on the inner side thereof, and which extends on both sides of the center line of the frame. The caster-wheel is mounted in a trailing frame $e$, which is connected at its front end by a vertical pivot $e'$ to the middle portion of the bearing F. The latter is provided with laterally-projecting draft-arms arranged symmetrically on opposite sides of the center.

The draft connection G is attached to the outer draft-arm, so that the draft connection is attached to the harrow-frame at a considerable distance outside of the center line thereof. Each draft-arm $f$ of the bearing is provided near its end in its front side with a recess or half-socket $g$, which is fitted against the inner or rear side of the front portion of the frame and closed by the latter. H is a clevis or similar draft device swiveled with its rear portion in this depression of the outer draft-arm and connecting with the hook of the draft connection G at the end of the evener or transverse draft-bar I. The latter is also, preferably, connected at its middle by a draft connection K with the pintle $k$ of the front hinge $a$.

L represents a curved fish-plate which is arranged against the front ends of the two bars constituting each harrow-frame and which bridges the joint thereof. This fish-plate, the bearing F, and the two frame-bars are secured together by bolts $l$.

Only one arm of the bearing F is engaged with the draft device. The other arm serves as an extension for securing the parts more firmly together and permits the bearing to be reversed, so that it may be used right or left with either frame.

The pull of the draft connections G is applied to the frames at a considerable distance outside of the center line of each frame, whereby the line of draft is located outside of the center line of each frame, thereby placing a greater number of teeth inside the line of draft than outside. This arrangement of the line of draft with reference to the teeth causes the inner teeth to preponderate and prevents the frames from crowding against each other and rising at the middle. The teeth in each section or frame of the harrow are thereby caused to cut to a practically uniform depth.

I claim as my invention—

1. The combination of two flexibly-connected harrow-frames arranged side by side, a bearing secured to the front portion of each frame, a caster-wheel pivoted to said bearing in the center line of the frame, and a draft device connected with the bearing outside of the center line of the frame, substantially as set forth.

2. The combination of a harrow-frame, a bearing secured against the front portion of said frame and provided with a draft-arm which extends outwardly along the frame and is provided in its outer portion with a recess which is closed by the frame, and a draft connection seated in said recess, substantially as set forth.

3. The combination of a harrow-frame, a reversible bearing secured against the front portion of said frame and provided with draft-arms which extend in opposite directions along the frame and are provided in their outer portions with recesses which are closed by the frame, and a draft connection seated in one of said recesses, substantially as set forth.

Witness my hand this 16th day of February, 1903.

HENRY J. CASE.

Witnesses:
C. W. LEFFINGWELL,
F. E. NAGEL.